United States Patent
Lee

(10) Patent No.: US 10,948,945 B2
(45) Date of Patent: Mar. 16, 2021

(54) ELECTRONIC APPARATUS WITH MULTIPLE OPERATING SYSTEMS AND CONTROL METHOD THEREOF

(71) Applicant: SAMSUNG ELECTRONICS CO., LTD., Suwon-si (KR)

(72) Inventor: Sungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/244,308

(22) Filed: Jan. 10, 2019

(65) Prior Publication Data

US 2019/0212776 A1    Jul. 11, 2019

(30) Foreign Application Priority Data

Jan. 10, 2018    (KR) .................. 10-2018-0003491

(51) Int. Cl.
*G06F 1/16*        (2006.01)
*H04M 1/725*    (2021.01)

(52) U.S. Cl.
CPC .......... *G06F 1/1632* (2013.01); *G06F 1/1647* (2013.01); *G06F 1/1656* (2013.01); *H04M 1/72527* (2013.01)

(58) Field of Classification Search
CPC combination set(s) only.
See application file for complete search history.

(56) References Cited

U.S. PATENT DOCUMENTS

| | | | |
|---|---|---|---|
| 6,763,458 B1 * | 7/2004 | Watanabe | G06F 9/441 713/100 |
| 7,506,152 B2 * | 3/2009 | Park | G06F 1/162 713/100 |
| 7,647,491 B2 | 1/2010 | Kawano et al. | |
| 8,959,324 B2 | 2/2015 | Youn | |
| 9,003,426 B2 | 4/2015 | Russello | |
| 9,152,582 B2 | 10/2015 | Reeves et al. | |

(Continued)

FOREIGN PATENT DOCUMENTS

| | | |
|---|---|---|
| EP | 3 247 044 A1 | 11/2017 |
| JP | 2006-301771 | 11/2006 |

(Continued)

OTHER PUBLICATIONS

International Search Report and Written Opinion dated Apr. 5, 2019, issued in International Application No. PCT/KR2019/000398.

(Continued)

*Primary Examiner* — Raymond N Phan
(74) *Attorney, Agent, or Firm* — Nixon & Vanderhye, P.C.

(57)    ABSTRACT

An electronic apparatus is provided. The electronic apparatus includes: a communicator comprising communication circuitry configured to provide a connection to another electronic apparatus; a storage configured to store a plurality of operating systems, each of the plurality of operating systems being different from each other; and a processor configured to identify the another electronic apparatus based on the electronic apparatus being connected to the another electronic apparatus, and to operate an operating system corresponding to the identified another electronic apparatus from among the plurality of stored operating systems.

15 Claims, 16 Drawing Sheets

(56) References Cited

U.S. PATENT DOCUMENTS

| | | |
|---|---|---|
| 9,367,331 B2 | 6/2016 | Galicia et al. |
| 2003/0204708 A1* | 10/2003 | Hulme .................. G06F 9/441 |
| | | 713/1 |
| 2004/0226023 A1* | 11/2004 | Tucker .................... G06F 9/54 |
| | | 719/315 |
| 2006/0236086 A1 | 10/2006 | Tsuji et al. |
| 2007/0005661 A1* | 1/2007 | Yang .................. G06F 16/1767 |
| 2008/0155103 A1* | 6/2008 | Bailey .................. G06F 9/544 |
| | | 709/227 |
| 2009/0083829 A1* | 3/2009 | Peterson ............ G06F 9/45558 |
| | | 726/1 |
| 2010/0005396 A1* | 1/2010 | Nason .................. G06F 3/1438 |
| | | 715/746 |
| 2010/0064228 A1* | 3/2010 | Tsern .................... G06F 3/1415 |
| | | 715/740 |
| 2010/0211769 A1* | 8/2010 | Shankar ............. G06F 9/45533 |
| | | 713/2 |
| 2010/0250975 A1* | 9/2010 | Gill ...................... G06F 1/1632 |
| | | 713/300 |
| 2010/0319008 A1* | 12/2010 | Ho ...................... G06F 9/45537 |
| | | 719/319 |
| 2011/0016299 A1* | 1/2011 | Galicia ............... G06F 9/45537 |
| | | 713/1 |
| 2011/0016301 A1 | 1/2011 | Galicia et al. |
| 2011/0126216 A1* | 5/2011 | Galicia ............... G06F 9/45533 |
| | | 719/318 |
| 2011/0312383 A1 | 12/2011 | Youn |
| 2012/0005691 A1* | 1/2012 | Wong .................... G06F 9/541 |
| | | 719/319 |
| 2012/0084791 A1* | 4/2012 | Benedek ................ G06F 13/14 |
| | | 719/313 |
| 2012/0124354 A1* | 5/2012 | Batwara ................ G06F 1/3203 |
| | | 713/2 |
| 2012/0166676 A1* | 6/2012 | Roper ...................... G06F 9/54 |
| | | 709/250 |
| 2013/0167159 A1* | 6/2013 | Ricci ..................... H04W 4/90 |
| | | 719/319 |
| 2013/0325479 A1 | 12/2013 | Krueger et al. |
| 2015/0067196 A1* | 3/2015 | Little .................... G06F 9/441 |
| | | 710/14 |
| 2015/0227547 A1 | 8/2015 | Davis et al. |
| 2016/0062807 A1 | 3/2016 | Reeves et al. |
| 2016/0139936 A1 | 5/2016 | Sengupta et al. |
| 2016/0196146 A1* | 7/2016 | Wilson ..................... G06F 9/54 |
| | | 713/1 |
| 2016/0381202 A1 | 12/2016 | Koo et al. |

FOREIGN PATENT DOCUMENTS

| | | |
|---|---|---|
| KR | 10-2011-0111828 | 10/2011 |
| KR | 10-2011-0138543 | 12/2011 |
| KR | 10-2017-0001393 | 1/2017 |

OTHER PUBLICATIONS

Extended European Search Report dated Nov. 16, 2020 for EP Application No. 19738516.4.

\* cited by examiner

1000

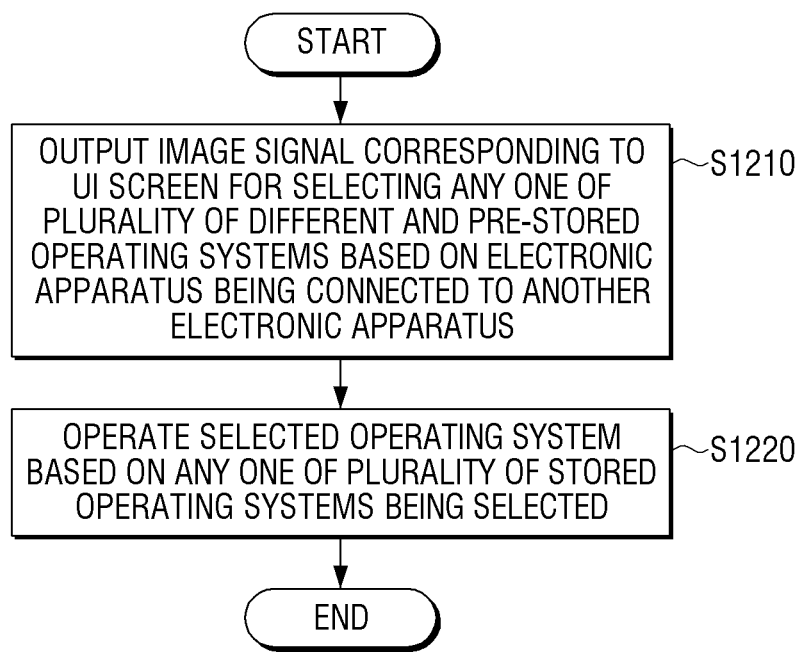

ELECTRONIC APPARATUS WITH MULTIPLE OPERATING SYSTEMS AND CONTROL METHOD THEREOF

CROSS-REFERENCE TO RELATED APPLICATION

This application is based on and claims priority under 35 U.S.C. § 119 to Korean Patent Application No. 10-2018-0003491, filed on Jan. 10, 2018, in the Korean Intellectual Property Office, the disclosure of which is incorporated by reference herein in its entirety.

BACKGROUND

Field

The disclosure relates to an electronic apparatus and a control method thereof, and, for example, to an electronic apparatus capable of supporting a plurality of operating systems, and a control method thereof.

Description of Related Art

In recent days, a technology related to a docking system in which a portable terminal apparatus such as a smartphone is connected by being placed on a dock and a screen of the smartphone is output through a display apparatus connected to the dock. Such a docking system as described above is commonly referred to as a docking station, and a dock connected to a portable terminal apparatus is commonly referred to as a smart dock, a dex, or the like.

The docking station outputs a screen of a portable terminal apparatus having a small display panel through a display apparatus having a large display panel, thereby providing a more convenient watching environment to a user. Further, in the docking station, an input device connected to the display apparatus, such as a keyboard, a mouse, or the like interworks with software provided in the portable terminal apparatus, thereby providing a working experience under a desktop computer environment to the user.

Meanwhile, a multi-operating system (OS) technology enables an electronic apparatus supporting one multi-OS to have a host operating system and a guest operating system which may be selectively loaded, thereby providing a plurality of working environments. However, in case that an electronic apparatus supporting such a multi-OS is connected to a dock, there is no method of managing the multi-OS, in which it is possible to determine an operation screen of which OS is to be output through a display apparatus.

SUMMARY

Embodiments of the disclosure address the above disadvantages and other disadvantages not described above.

The disclosure provides an electronic apparatus capable of operating and managing a multi-OS in a docking station, and a control method thereof According to an example embodiment of the disclosure, an electronic apparatus includes: a communicator comprising communication circuitry configured to provide a connection to another electronic apparatus; a storage configured to store a plurality of operating systems, each of the plurality of operating systems being different from each other; and a processor configured to identify the another electronic apparatus based on the electronic apparatus being connected to the another electronic apparatus, and to operate an operating system corresponding to the identified another electronic apparatus from among the plurality of stored operating systems.

The processor may transmit an image signal corresponding to an operation screen of the operated operating system to the another electronic apparatus through the communicator so that the image signal corresponding to the operation screen is output in a display apparatus connected to the another electronic apparatus.

The electronic apparatus may further include a display. The processor may control the display to output an image signal corresponding to an operation screen of the operated operating system.

The storage may further store identification information of the another electronic apparatus and setting information of the operating system to be operated with the connection to the another electronic apparatus. The processor may identify the another electronic apparatus using the stored identification information, and operate the operating system corresponding to the identified another electronic apparatus using the setting information.

The setting information may be information set based on a preference of a user or a characteristic of the another electronic apparatus.

The communicator may include an interface comprising circuitry configured to provide a connection to the another electronic apparatus in a wired manner and/or docking with the another electronic apparatus.

The communicator may include an interface comprising circuitry configure to provide a wireless connection to the another electronic apparatus.

According to another example embodiment of the disclosure, an electronic apparatus includes: a communicator comprising communication circuitry configured to provide a connection to another electronic apparatus; a storage configured to store a plurality of operating systems, each of the plurality of operating systems being different from each other; and a processor configured to control a display to output an image signal corresponding to a user interface (UI) screen for selecting any one of the plurality of stored operating systems based on the electronic apparatus being connected to the another electronic apparatus, and to operate the selected operating system based on any one of the plurality of stored operating systems being selected.

The display may be included in a display apparatus connected to the another electronic apparatus. The processor may transmit an image signal corresponding to an operation screen of the operated operating system to the another electronic apparatus through the communicator so that the image signal corresponding to the operation screen is output in the display apparatus connected to the another electronic apparatus.

The display may be included in the electronic apparatus. The processor may control the display to output an image signal corresponding to an operation screen of the operated operating system.

The UI screen may be a screen providing a list of the plurality of stored operating systems.

The communicator may include an interface comprising circuitry configured to provide a connection to the another electronic apparatus in a wired manner and/or docking with the another electronic apparatus.

The communicator may include an interface comprising circuitry configured to provide a wireless connection to the another electronic apparatus.

According to an example embodiment of the disclosure, a control method of an electronic apparatus may include: identifying another electronic apparatus based on the electronic apparatus being connected to the another electronic apparatus; and operating an operating system corresponding to the identified another electronic apparatus from among a plurality of different and pre-stored operating systems.

The control method may further include transmitting an image signal corresponding to an operation screen of the operated operating system to the another electronic apparatus so that the image signal corresponding to the operation screen is output in a display apparatus connected to the another electronic apparatus.

The control method may further include outputting an image signal corresponding to an operation screen of the operated operating system through a display included in the electronic apparatus.

In the identifying, the another electronic apparatus may be identified using pre-stored identification information of the another electronic apparatus. In the operating, an operating system corresponding to the identified another electronic apparatus may be operated using pre-stored setting information related to an operating system to be operated with the connection to the another electronic apparatus.

The setting information may be information set based on a preference of a user or a characteristic of the another electronic apparatus.

According to another example embodiment, a control method of an electronic apparatus may include: outputting an image signal corresponding to a UI screen for selecting any one of a plurality of different and pre-stored operating systems based on the electronic apparatus being connected to another electronic apparatus; and operating the selected operating system based on any one of the plurality of stored operating systems being selected.

The control method may further include transmitting an image signal corresponding to the operation screen of an operated operating system to the another electronic apparatus so that the image signal corresponding to the operation screen is output in a display apparatus connected to the another electronic apparatus.

The control method may further include outputting an image signal corresponding to an operation screen of the operated operating system through a display included in the electronic apparatus.

According to an example embodiment of the disclosure, in a recording medium in which a program for executing a control method of an electronic apparatus is stored, the control method may include: identifying another electronic apparatus based on the electronic apparatus being connected to the another electronic apparatus; and operating an operating system corresponding to the identified another electronic apparatus from among a plurality of different and pre-stored operating systems.

According to various example embodiments of the disclosure, as the electronic apparatus is connected to the dock in the docking station environment, the user may be conveniently provided with a working environment of a preferred OS, thereby improving convenience of the user.

Additional and/or other aspects and advantages of the disclosure will be set forth in part in the description which follows and, in part, will be apparent from the description.

BRIEF DESCRIPTION OF THE DRAWINGS

The above and/or other aspects, features and advantages of certain embodiments of the disclosure will be more apparent from the following detailed description, taken in conjunction with the accompanying drawings, in which:

FIG. 12 is a flowchart illustrating an example control method of an electronic apparatus according to another embodiment of the disclosure.

DETAILED DESCRIPTION

Figure 1A:
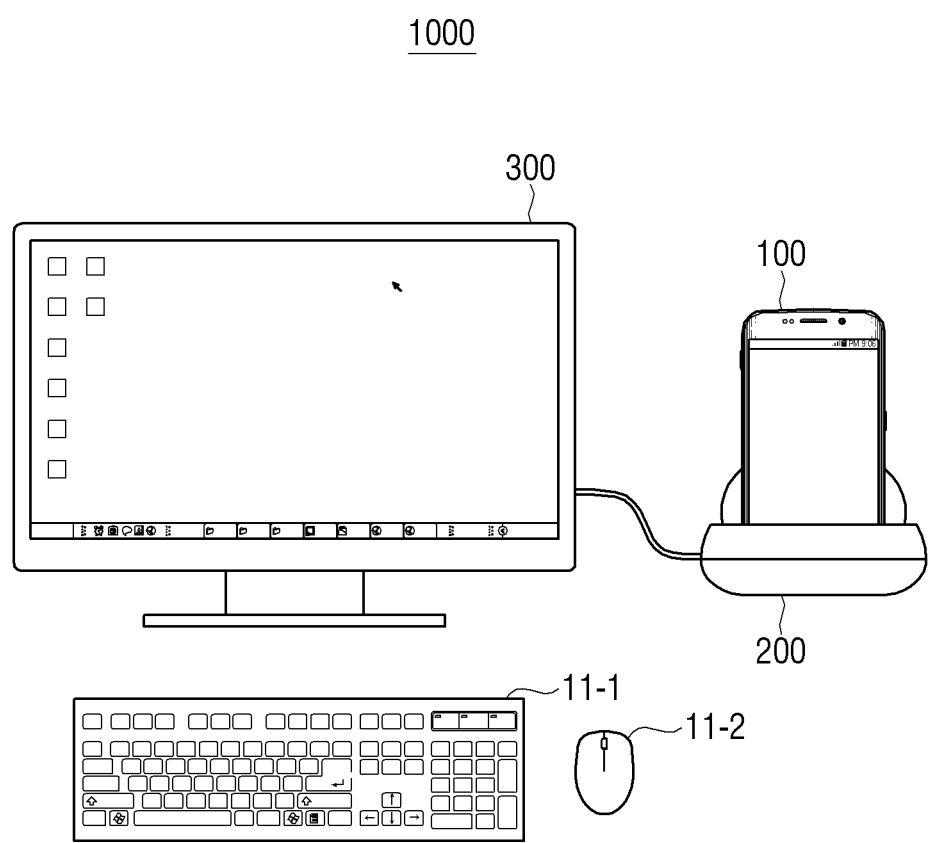
FIG. 1A is diagram illustrating an example docking station according to an embodiment of the disclosure.

Before describing the disclosure in greater detail, an overview of the disclosure and the drawings is provided below.

As terms used in the disclosure and claims, general terms have been selected in consideration of functions in various example embodiments of the disclosure. However, these terms may be changed with an intention of one skilled in the art, legal or technical interpretation, the emergence of new technology, and the like. In addition, some terms may be arbitrarily selected. These terms may be interpreted as having a meaning set forth in the disclosure, and in case that the terms are not specifically defined, the terms may be interpreted based on general contents of the disclosure and a common technical knowledge in a corresponding technical field.

In addition, throughout the accompanying drawings in the disclosure, like reference numerals denote parts or components performing substantially the same functions. For convenience of explanation and understanding, the same reference numerals will be used in embodiments different from each other. That is, even when components having the same reference numeral are illustrated in all of a plurality of drawings, it does not mean that the plurality of drawings illustrate the same embodiment.

Further, in the specification and claims, terms including an ordinal number such as "first", "second", or the like may be used to distinguish components from each other. The ordinal number is used to distinguish the same or similar components from each other, and a term is not limited by the use of the ordinal number. For example, in case of a component represented by a term combined with the ordinal number, the order of use or disposition of the component should not be interpreted as being limited by the ordinal number. If necessary, ordinal numbers may be replaced with each other.

In the disclosure, singular forms are intended to include plural forms unless the context clearly indicates otherwise. It should be understood that terms "comprise" or "include" used in the present disclosure, specify the presence of features, numerals, steps, operations, components, parts mentioned in the present disclosure, or combinations thereof, but do not preclude the presence or addition of one or more other features, numerals, steps, operations, components, parts, or combinations thereof In embodiments of the disclosure, a "module", a "unit", or a "-er/-or" may refer, for example, to a component performing at least one function or operation, and may be implemented by hardware or software or be implemented by any combination of hardware and software. In addition, a plurality of "modules", a plurality of "units", or a plurality of "-ers/-ors" may be integrated in at least one module and be implemented by at least one processor (not illustrated) except for a "module", a "unit", or a "-er/-or" that must be implemented by specific hardware.

In various example embodiments of the disclosure, connection between one portion and another portion includes not only direct connection but also indirect connection via a medium. In addition, unless explicitly described otherwise, "comprising" any components will be understood to imply the inclusion of other components but not the exclusion of any other components.

Hereinafter, the disclosure will be described in greater detail with reference to the accompanying drawings.

Figure 1B:
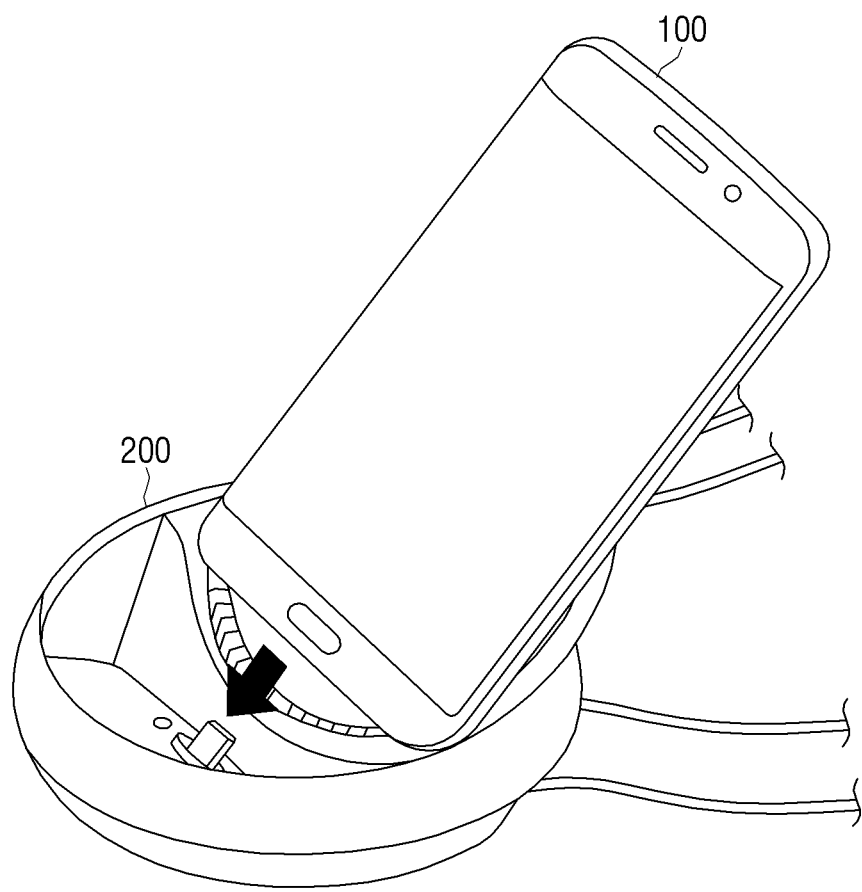
FIG. 1B is diagram illustrating an example docking station according to an embodiment of the disclosure.

FIGS. 1A and 1B are diagrams illustrating an example docking station according to an embodiment of the disclosure.

As illustrated in FIG. 1A, a docking station arrangement 1000 of the disclosure may include an electronic apparatus 100, a dock 200, and a display apparatus 300.

The electronic apparatus 100 may store a plurality of operating systems (hereinafter, referred to as OS) therein and is may be capable of selectively loading and operating the stored OS. The OS may refer, for example, to a platform providing an environment under which a user program may be efficiently executed in the electronic apparatus 100.

An example purpose of the docking station arrangement 1000 is to provide a more convenient watching environment and/or working environment by outputting a screen of a portable terminal apparatus having a small display panel through a display apparatus having a large display panel. Therefore, in general, the electronic apparatus 100 may implemented by a portable terminal apparatus such as, for example, and without limitation, a smartphone which may be connected by being placed in the dock 200 as illustrated in FIG. 1A.

However, the electronic apparatus 100 may be implemented by various electronic apparatuses, including any kind of electronic apparatus such as, for example, and without limitation, a tablet computer, a personal digital assistant (PDA), a small personal computer (PC), a laptop computer, and the like, and the technical idea of the disclosure is not limited by the kind of electronic apparatus 100.

The dock 200 may be connected to the electronic apparatus 100 and the display apparatus 300 and perform data transmission between the electronic apparatus 100 and the display apparatus 300. The dock 200 generally serves to transfer a screen provided in the electronic apparatus 100 to the display apparatus 300. For example, the dock 200 may have a structure in which the dock 200 may function as a holder for fixing the electronic apparatus 100. The electronic apparatus 100 may be placed in a state where it is docked with the dock 200 through an interface such as, for example, and without limitation, a physical input/output terminal or the like as illustrated in FIG. 1B.

However, the electronic apparatus 100 and the dock 200 may also be connected to each other through wireless communication without the physical input/output terminal. For example, the electronic apparatus 100 and the dock 200 may be connected to each other through various communication manners such as, for example, and without limitation, Bluetooth, Bluetooth low energy, Wi-Fi, Zigbee, or the like.

The dock 200 may be various electronic apparatuses capable of being connected to the electronic apparatus 100 wirelessly or in a wired manner. For example, the dock 200 may be implemented, for example, and without limitation, by a game pad, or the like in various example embodiments, which will be described in greater detail below.

The display apparatus 300 may include a display panel capable of providing a screen and may be generally implemented, for example, and without limitation, by a television (TV), a monitor, or the like. The display apparatus 300 may, for example, display a screen provided in the electronic apparatus 100.

In general, the display apparatus 300 may include a display panel larger than a display panel of the electronic apparatus 100. This may provide the user with a more convenient watching environment and/or working environment by outputting a screen provided in the electronic apparatus 100 having the small display panel through the display apparatus having the large display panel.

For example, the display apparatus 300 may be connected to various input devices such as, for example, and without limitation, a keyboard 11-1, a mouse 11-2, and the like. Therefore, the user may watch contents stored in the electronic apparatus 100 through the display apparatus 300 and control the corresponding contents through the various input devices described above. Therefore, the user may be provided with convenience similar to a desktop environment.

For example, the display apparatus 300 may be connected to the dock 200 through various cable terminals such as, for example, and without limitation, a digital visual interface (DVI), a high definition multimedia interface (HDMI), a video graphics array (VGA), a display port (DP), and the like.

Hereinafter, an example configuration of the electronic apparatus 100 will be described in greater detail with reference to FIGS. 2A and 2B.

Figure 2A:
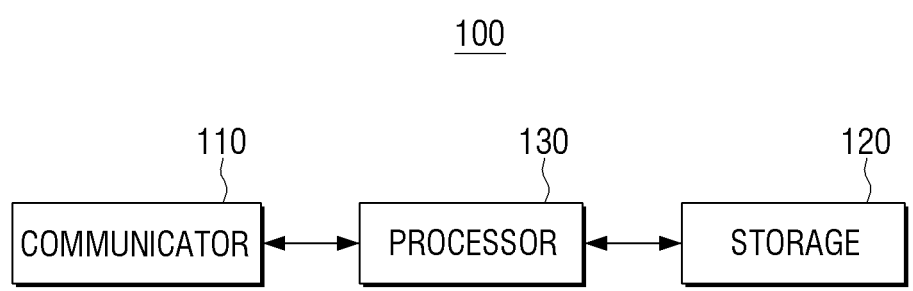
FIG. 2A is block diagram illustrating an example configuration of an electronic apparatus according to an embodiment of the disclosure.
Figure 2B:
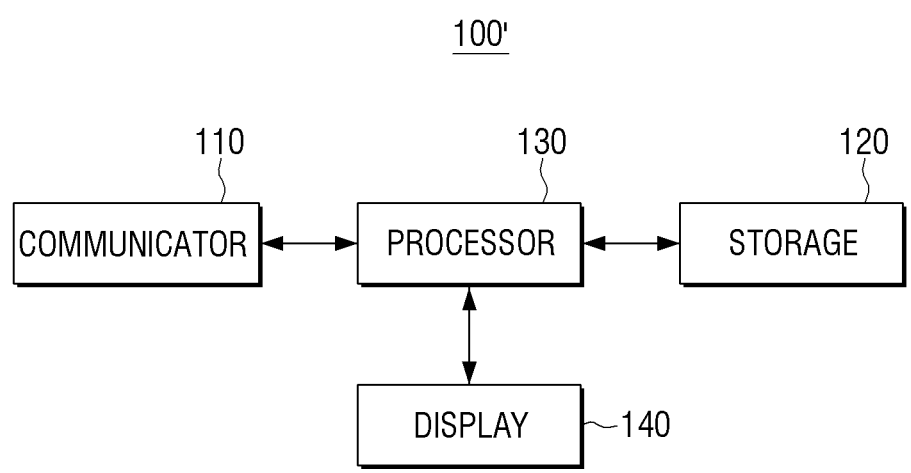
FIG. 2B is block diagram illustrating an example configuration of an electronic apparatus according to an embodiment of the disclosure.

FIGS. 2A and 2B are block diagrams illustrating example configurations of electronic apparatuses according to embodiments of the disclosure.

Referring to FIG. 2A, the electronic apparatus 100 according to an embodiment of the disclosure includes a communicator (e.g., including communication circuitry) 110, a storage 120, and a processor (e.g., including processing circuitry) 130.

The communicator 110 may include various communication circuitry and may communicate with the dock 200 wirelessly or in a wired manner. When the electronic apparatus 100 communicates with the dock 200 in a wired manner, the communicator 110 may include a physically implemented connector to communicate with the dock 200. Implementation of the connector is not limited, and the connector of the communicator 110 may be connectors with various type such as, for example, and without limitation, a micro-USB type connector, a mini-USB type connector, or the like. The connector may also simultaneously function as a connector for charging the electronic apparatus 100.

When the electronic apparatus 100 wirelessly communicates with the dock 200, the communicator 110, provides an interface for wireless connection with the dock 200, and may include various communication chips including various communication circuitry depending on a communication manner such as, for example, and without limitation, Bluetooth, Bluetooth low energy, Wi-Fi, Zigbee, or the like.

In some example embodiments, the communicator 110 may also communicate with an external apparatus including a server, which will be described in greater detail below.

The storage 120 may, for example, be a component storing a plurality of difference OSs. For example, the storage 120 may store various OSs such as, for example, and without limitation, Windows, Linux, Unix, Android, macOS, and the like, therein. The processor 130 may selectively load the plurality of OSs stored in the storage 120 or simultaneously load the plurality of OSs.

In a state where one OS is already operated in a single computer device, when another OS is virtually operated, the OS operated earlier may be commonly referred to, for example, as a host OS, and the OS operated additionally may be referred to as a guest OS.

In addition, the OS may also be provided from an external apparatus, other than the electronic apparatus. A virtual desktop infrastructure (hereinafter, referred to as VDI) may refer, for example, to a technology of providing a cloud-based virtual desktop service through the Internet, in which, for example, and without limitation, a server maintains data of the user and an OS environment, and the user accesses the corresponding OS environment through a network to remotely use a virtual desktop provided in the corresponding OS environment. An example of a VDI will be described in greater detail below.

The storage 120 may, for example, store identification information of the dock 200 connected to the electronic apparatus 100 and setting information of an OS to be operated according to the identification information of the dock 200, therein. For example, the storage 120 may store, as the setting information, a matching table in which information on the kind of dock 200 and a certain OS to be operated based on the kind of dock 200, therein. Such a matching may, for example, be set in a manufacturing process and/or by the user. The setting information may be set based on a preference of the user or a characteristic of the dock 200. For example, the setting information may be generated, for example, and without limitation, by being directly input by the user, or may be generated using history information of OSs operated by the user, or the like. In addition, the setting information may also be generated in a manner that an OS appropriate for the dock 200 is automatically set depending on the kind of dock 200 based on the identification information of the dock 200.

The above-described storage 120 may, for example, include a hard disk drive (HDD), a solid state drive (SDD), a dynamic random-access memory (DRAM), a static random-access memory (SRAM), a ferroelectric random-access memory (FRAM), a flash memory, or may be various types of memories not mentioned above. The various example embodiments of the disclosure are not affected by the type of implemented storage 120.

The processor 130 may include various processing circuitry for controlling a general operation of the electronic apparatus 100. For example, when the electronic apparatus 100 is connected to another electronic apparatus, the processor 130 may identify the another electronic apparatus, and operate an OS corresponding to the identified another electronic apparatus among the plurality of stored OSs. Here, the another electronic apparatus may include the dock 200.

For example, the processor 130 may detect connection between the electronic apparatus 100 and the dock 200 through the communicator 110, and receive identification information of the dock 200 through the communicator 110 when the electronic apparatus 100 is connected to the dock 200. The processor 130 may compare the received identification information and the identification information stored in the storage 120 with each other to identify the dock 200, and operate an OS matched to the identified dock 200 from among the plurality of OSs stored in the storage 120 by using matching information stored in the storage 120.

The processor 130 may, for example, operate the OS corresponding to the dock 200 using a virtual machine (hereinafter, referred to as VM) when an OS is already operated, or may selectively boot the OS corresponding to the dock 200 in case of a dual-booting environment. Further, the processor 130 may access an external server 400 to be provided with the cloud-based VDI depending on the kind of identified dock 200.

Hereinafter, for convenience of explanation, by way of non-limiting example, an operation of the disclosure will be described based on an embodiment in which an OS is additionally operated through the VM when an OS is already operated in the electronic apparatus 100 as a main embodiment, and the additional operated OS will be referred to as a guest OS.

When the guest OS is operated in the electronic apparatus 100 based on the connection between the electronic apparatus 100 and the dock 200, the processor 130 may transmit an image signal corresponding to an operation screen of the operated guest OS to the dock 200 through the communicator 110 so that the image signal corresponding to the operation screen of the OS may be output in the display apparatus 300 connected to the dock 200. The dock 200 may transmit the received image signal to the display apparatus 300, such that the operation screen of the guest OS is displayed in the display apparatus 300.

An electronic apparatus 100' according to another embodiment of the disclosure may further include a display 140 as illustrated in FIG. 2B. In case that the electronic apparatus 100' further includes the display 140, when the electronic apparatus 100' is connected to the dock 200, the processor 130 may also control the display 140 to output the image signal corresponding to the operation screen of the guest OS.

The operation screen of the guest OS may be displayed only in the electronic apparatus 100' or when the dock 200 is connected to the display apparatus 300, the operation screen of the guest OS may be simultaneously displayed in the electronic apparatus 100' and the display apparatus 300. However, the processor 130 may perform a control so that the operation screen of the guest OS is displayed in the display 140 and the display apparatus 300 by mirroring, or may perform a control so that the operation screen of the guest OS is displayed only in the display apparatus 300.

Figure 3:
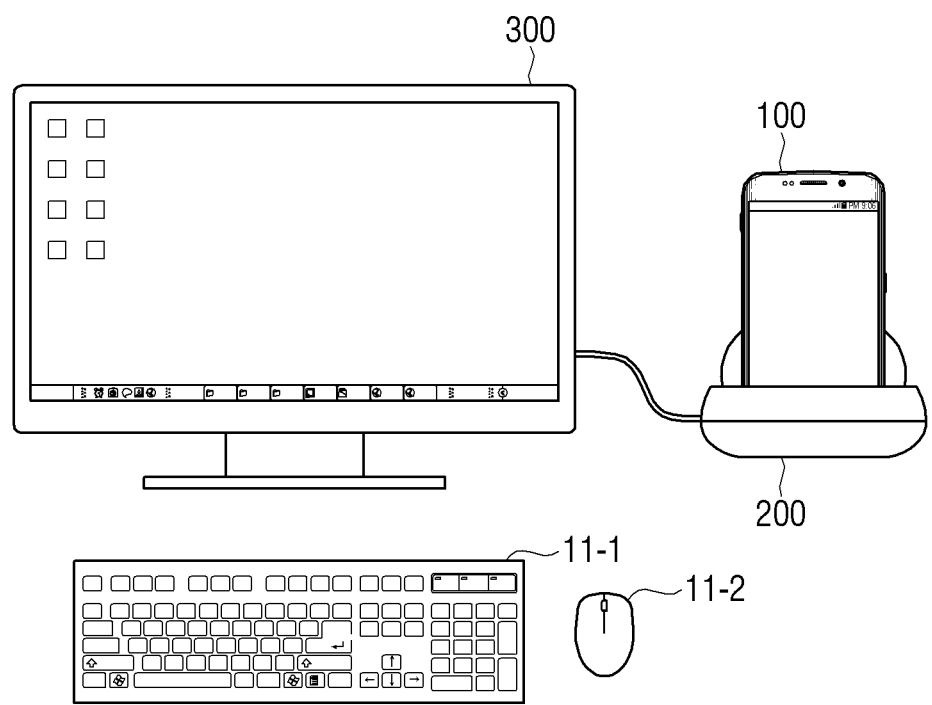
FIG. 3 is a diagram illustrating an example method of operating a guest operating system (OS) according to an embodiment of the disclosure.
Figure 4:
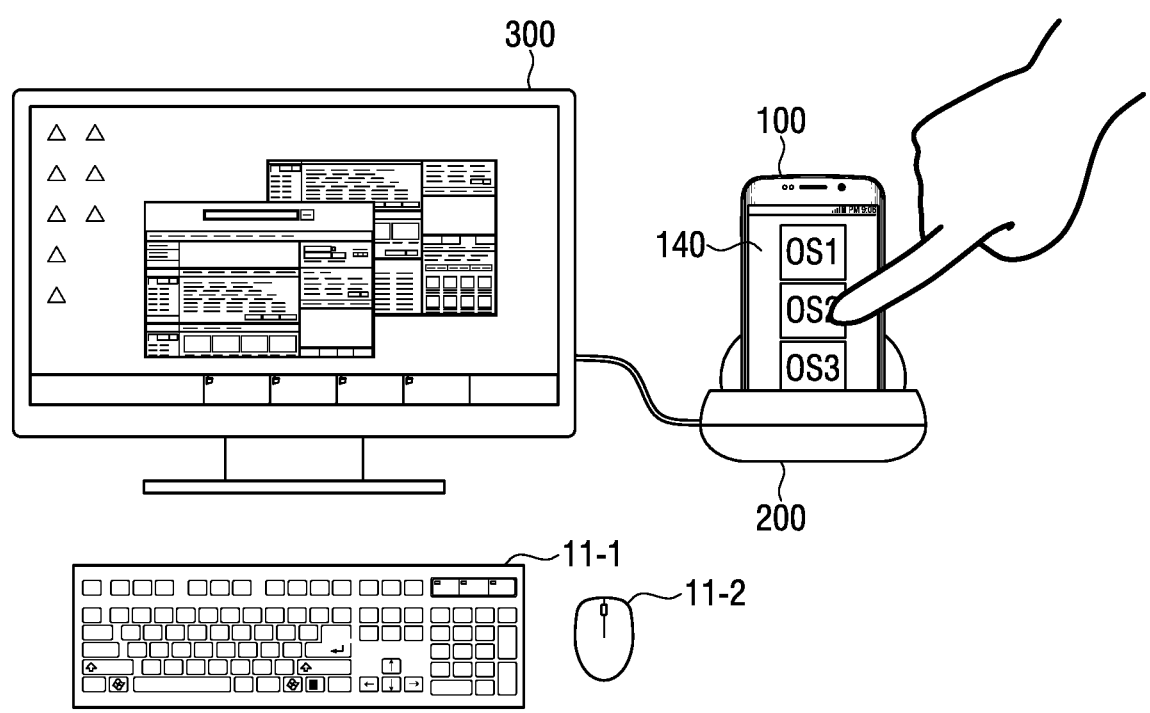
FIG. 4 is a diagram illustrating an example method of operating a guest OS according to another embodiment of the disclosure.
Figure 5:
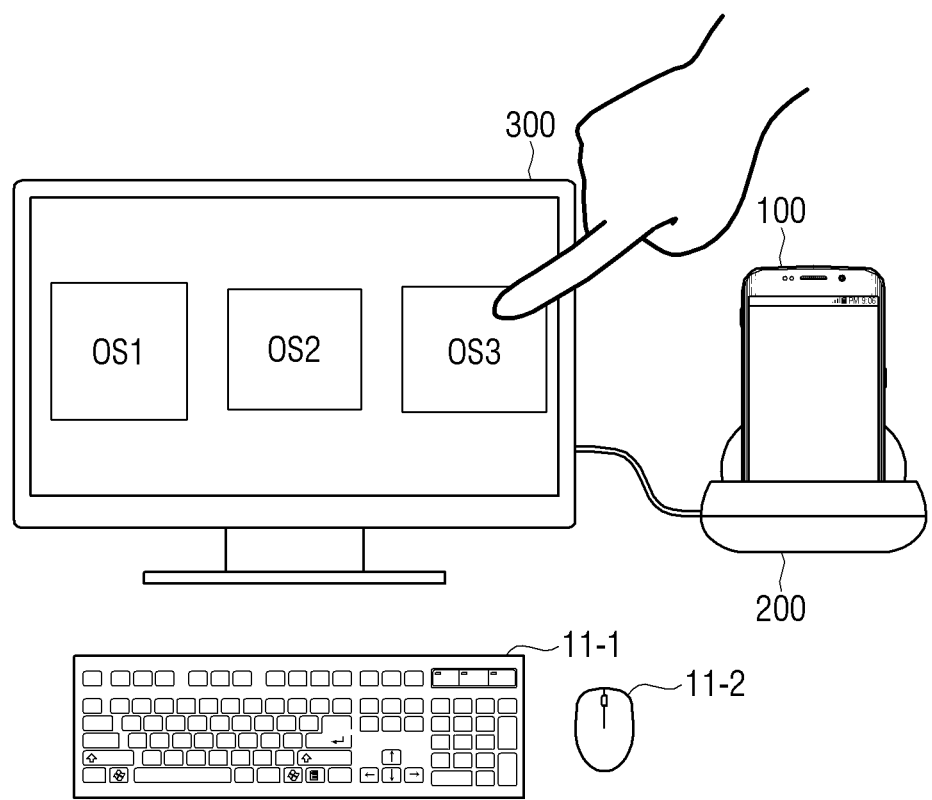
FIG. 5 is a diagram illustrating an example method of operating a guest OS according to still another embodiment of the disclosure.

FIG. 3 is a diagram for describing a method of operating a guest OS according to an embodiment of the disclosure, FIG. 4 is a diagram for describing a method of operating a guest OS according to an embodiment of of the disclosure, and FIG. 5 is a diagram for describing a method of operating a guest OS according to an embodiment of the disclosure.

FIG. 3 is a diagram illustrating an example embodiment in which a guest OS set based on a user preference in advance is operated when the electronic apparatus 100 is connected to the dock 200. The electronic apparatus 100 may provide a user interface (UI) for setting a guest OS preferred by the user according to the identification information of the dock 200. The corresponding UI may be displayed through the display 140 included in the electronic apparatus 100, or the display apparatus 300 connected to the electronic apparatus 100 through the dock 200.

When the electronic apparatus 100 is connected to the dock 200 for the first time, the processor 130 may provide a UI for setting a guest OS matched to the connected dock 200, and the user may select any one guest OS through the corresponding UI. Information on the selection of the guest OS may be stored in the storage 120 as a user preference, and when the electronic apparatus 100 is connected to the dock 200 again later, the guest OS selected by the user may be automatically operated based on the user preference stored in the storage 120. A screen of the automatically operated guest OS may be output through the display apparatus 300, and interwork with input devices 11-1 and 11-2 connected to the display apparatus 300.

FIG. 3 illustrates a state where a screen of an OS (e.g., OS1) is automatically operated with the connection between the electronic apparatus 100 and the dock 200 is output in the display apparatus 300 in case that the user sets the OS1 as the guest OS matched to the dock 200.

FIGS. 4 and 5 illustrate example embodiments in which the user directly selects a guest OS to be operated with the connection between the electronic apparatus 100 and the dock 200 in case that the user preference is not stored in the electronic apparatus 100.

According to the embodiment illustrated in FIG. 4, when the electronic apparatus 100 is connected to the dock 200, the processor 130 may control the display 140 to output an image signal corresponding to a UI screen for selecting any one of a plurality of stored guest OSs. When any one of the guest OSs is selected through the UI screen, the processor 130 may control the display 140 to output an image signal corresponding to an operation screen of the guest OS.

As illustrated in FIG. 4, when the electronic apparatus 100 is connected to the dock 200, the processor 130 may control the display 140 to display a UI for selecting any one of a plurality of guest OSs (OS1 to OS3) stored in the storage 120. The UI may include a list of the plurality of guest OSs stored in the storage 120.

When the user selects OS2 through the UI displayed in the display 140, the processor 130 operates the selected OS2. The processor 130 may transmit an image signal corresponding to an operation screen of the OS2 to the dock 200 through the communicator 110 so that the image signal corresponding to the operation screen of the OS2 may be output in the display apparatus 300 connected to the dock 200. As a result, the display apparatus 300 may display the operation screen of the OS2 as illustrated in FIG. 4.

According to the example embodiment illustrated in FIG. 5, when the electronic apparatus 100 is connected to the dock 200, the processor 130 may control the display apparatus 300 to output an image signal corresponding to a UI screen for selecting any one of a plurality of stored guest OSs. When any one guest OS is selected through the UI screen displayed in the display apparatus 300, the processor 130 may operate the selected guest OS. The processor 130 may transmit an image signal corresponding to an operation screen of the selected guest OS to the dock 200 so that the image signal corresponding to the operation screen of the selected guest OS may be output in the display apparatus 300.

As illustrated in FIG. 5, when the user selects OS3 through the UI displayed in the display apparatus 300, the display apparatus 300 may display an operation screen of the OS3.

Figure 6A:
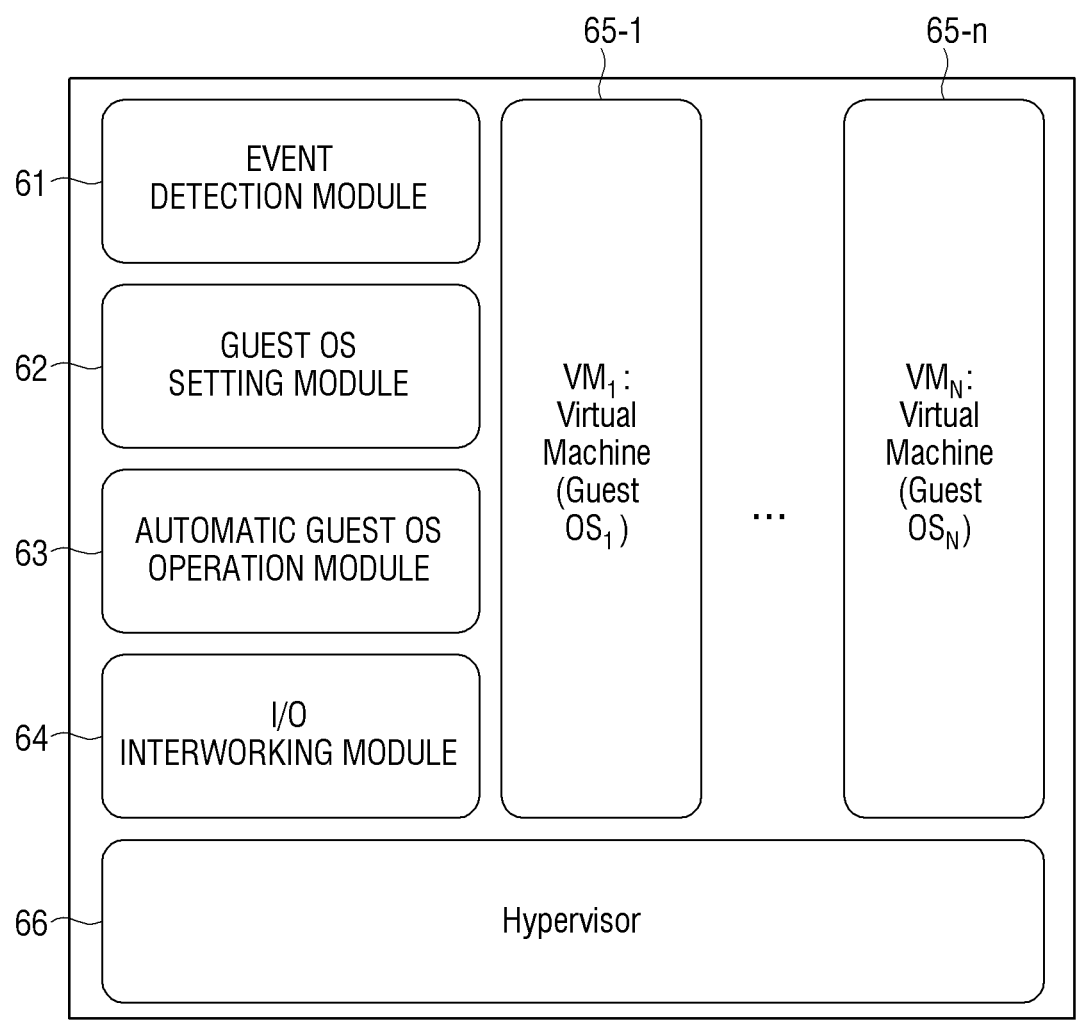
FIG. 6A is block diagram illustrating an example architecture in which a virtual machine (VM) for operating a guest OS is executed according to an embodiment of the disclosure.
Figure 6B:
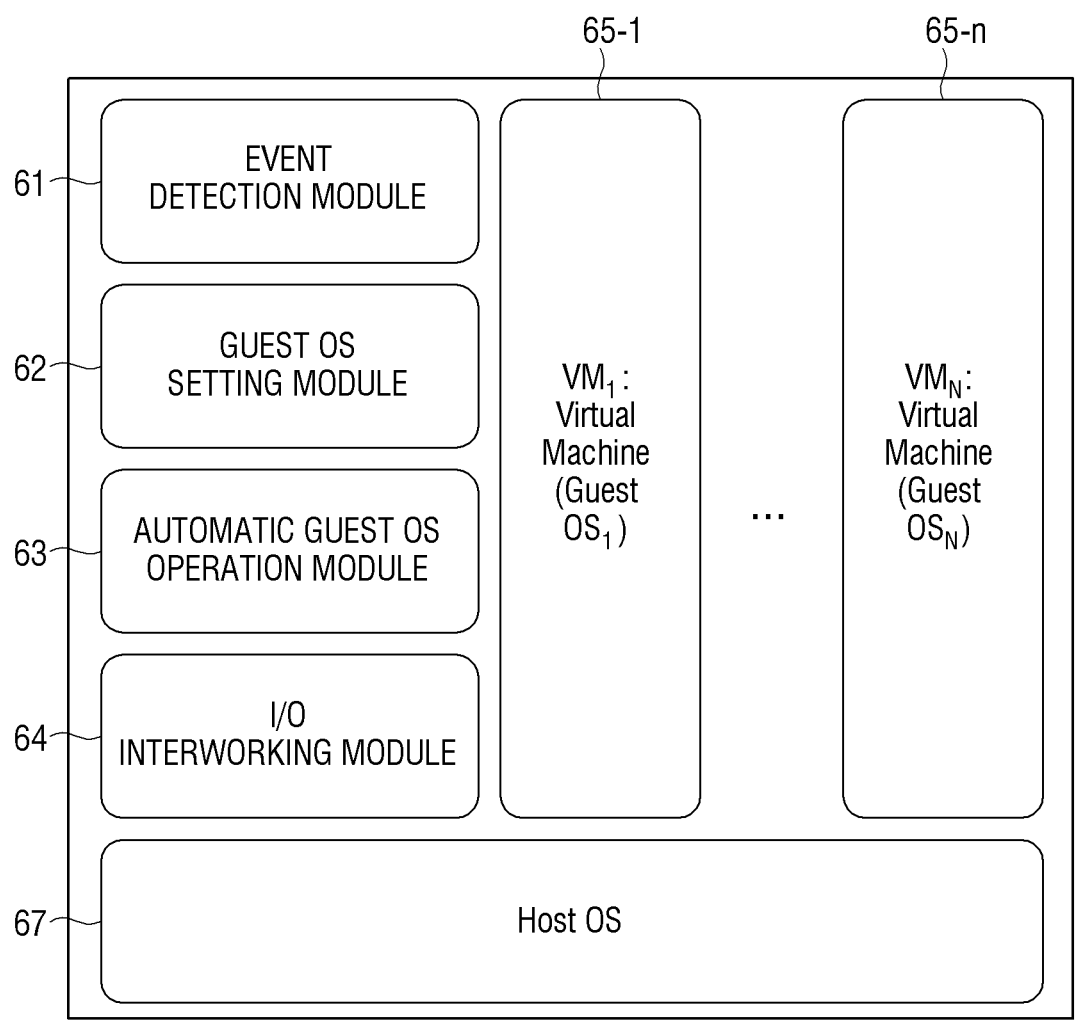
FIG. 6B is block diagram illustrating an example architecture in which a virtual machine (VM) for operating a guest OS is executed according to an embodiment of the disclosure.
Figure 6C:
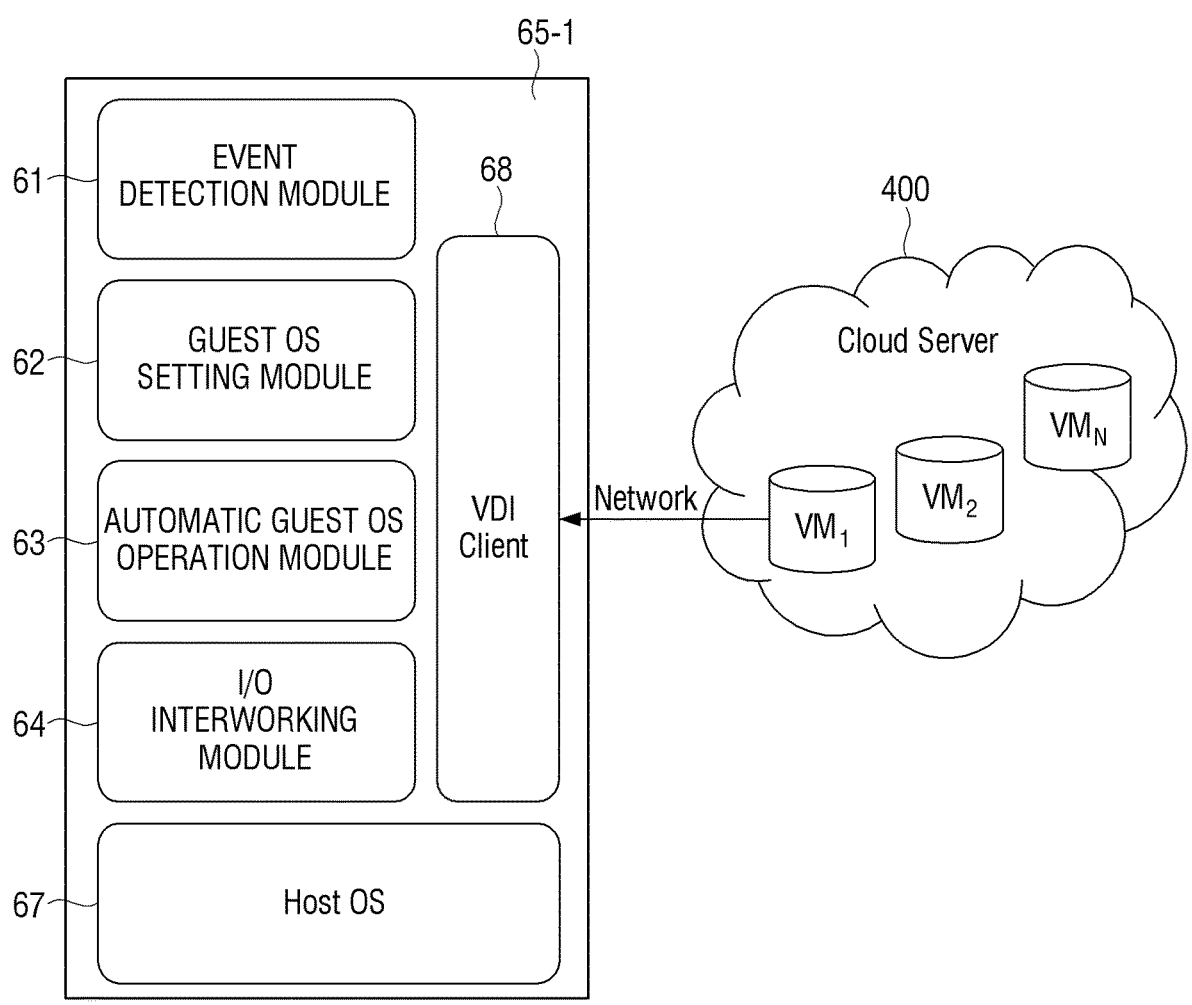
FIG. 6C is block diagram illustrating an example architecture in which a virtual machine (VM) for operating a guest OS is executed according to an embodiment of the disclosure.

FIGS. 6A, 6B and 6C are block diagrams illustrating example architectures in which a guest OS is operated according to various embodiments of the disclosure.

According to the embodiments illustrated in FIGS. 6A, 6B and 6C, each architecture may include an event detection module (e.g., including processing circuitry and/or program elements) 61 configured to detect an event of connection to the dock 200, a guest OS setting module (e.g., including processing circuitry and/or program elements) 62 configured to set a guest OS to be automatically operated at the time of connection to the dock 200, an automatic guest OS operation module (e.g., including processing circuitry and/or program elements) 63 configured to automatically operate the guest OS based on the event of connection to the dock 200, and an I/O interworking module (e.g., including processing circuitry and/or program elements) 64 configured to interwork between an I/O signal of the guest OS, and the display apparatus 300 and devices such as the keyboard 11-1, the mouse 11-2, or the like connected to the display apparatus 300 at the time of connection to the dock 200.

When the event of connection to the dock 200 set in advance is detected through the event detection module 61 and the guest OS setting module 62, the guest OS corresponding to the dock 200, which is set in advance, may be operated through the automatic guest OS operation module 63 and the I/O interworking module 64. The guest OS may be operated in various manners as illustrated, for example, and without limitation, in FIGS. 6A, 6B and 6C.

The architecture illustrated in FIG. 6A may be referred to, for example, as a bare-metal virtualization architecture, and may include a plurality of virtual machine $VM_1$ to $VM_N$ software 65-1 to 65-$n$ different from each other and a hypervisor 66. The hypervisor 66, which may, for example, be a logical platform for simultaneously executing the $VM_1$ to $VM_N$ software 65-1 to 65-$n$, may also be referred to as a virtual machine monitor (VMM). The hypervisor 66 may be directly executed on hardware without relying on a host OS, and such a bare-metal virtualization architecture supports a real-time OS and enables improved I/O access through partitioning, which is advantageous.

Such a hypervisor type virtualization software may, for example, and without limitation, be ESX/EXSi server of VMware, XenServer of Citrix, VM server of Oracle, xVM Server of Sun Microsystems, Hyper-V of Microsoft, Virtual Iron of Virtual Iron, Parallels Server of Parallels, or the like.

The architecture illustrated in FIG. 6B is a hosted virtualization architecture, and includes a plurality of virtual machine $VM_1$ to $VM_N$ software 65-1 to 65-n different from each other and a host OS 67. In the hosted virtualization architecture, a VMM may be installed on the host OS 67 and a VM may be executed on the VMM. Such a hosted virtualization architecture may execute various kinds of VMs, which is advantageous.

The hosted virtualization architecture may, for example, and without limitation, be VMware Workstation, VMware Server, and VMware Player of VMWare, Virtual Server and Virtual PC of Microsoft, VirtualBox of Sun Microsystems, Workstation of Parallels, or the like.

The architecture illustrated in FIG. 6C is a desktop virtualization architecture and may include a virtual desktop infrastructure (VDI) client 68. The VDI client 68 may be provided with a cloud-based desktop environment desired by the user through a VM corresponding to the user of the electronic apparatus 100 among a plurality of different virtual machine $VM_1$ to $VM_N$ software stored in an external server 400.

Figure 7:
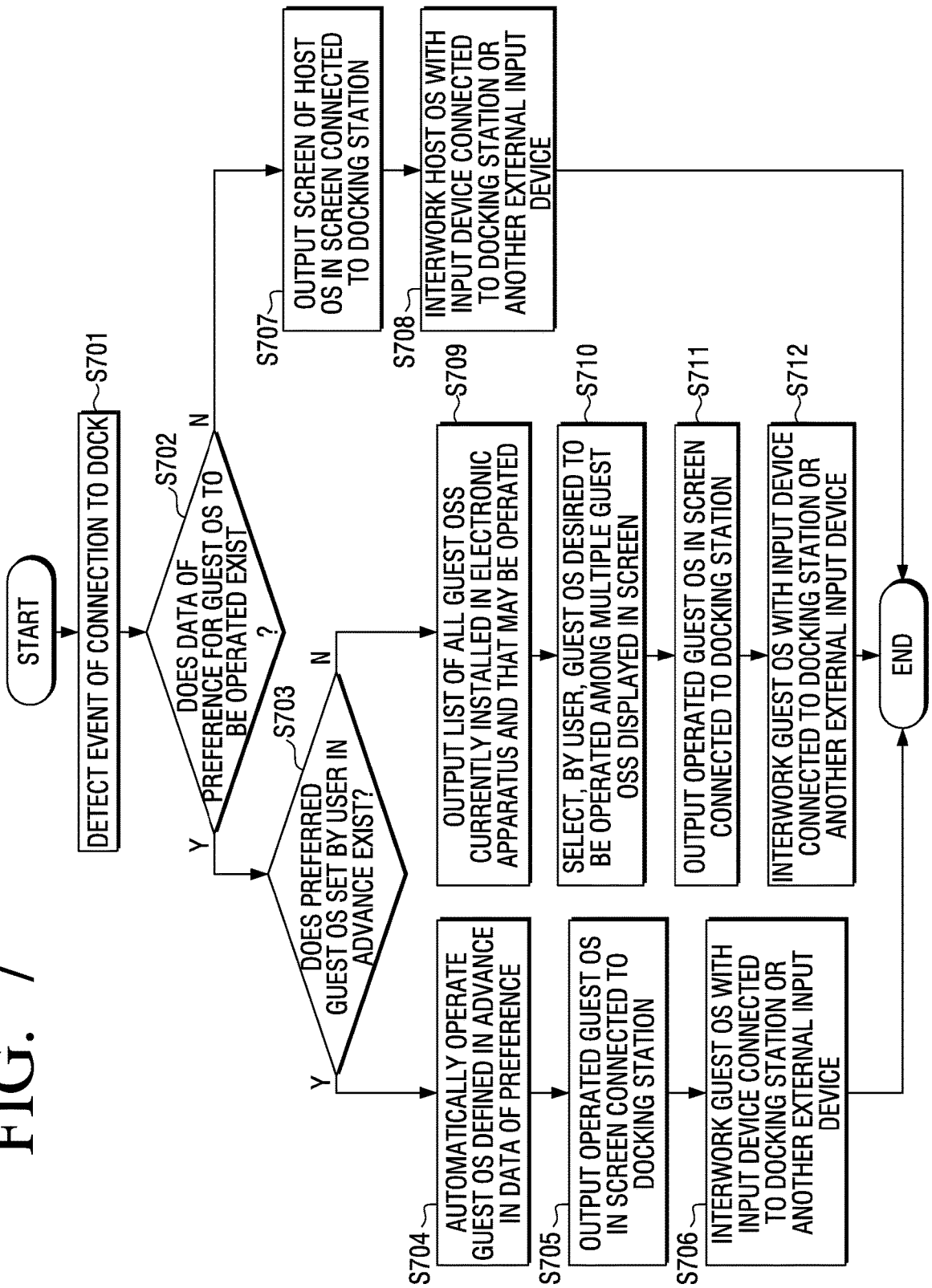
FIG. 7 is a flowchart illustrating an example process of operating a guest OS by docking an electronic apparatus according to an embodiment of the disclosure.

FIG. 7 is a flowchart illustrating an example process of operating a guest OS by connection between the electronic apparatus and the dock according to an embodiment of the disclosure.

An event of connection to the dock 200 may be detected (S701). The electronic apparatus 100 receives identification information from the dock 200, and determines whether data of a preference for a guest OS to be operated at the time of connection to the dock 200 exists based on the received identification information (S702). The data of the preference for the guest OS to be operated at the time of connection to the dock 200 means data related to a user preference for a guest OS to be operated when the dock 200 is connected to the electronic apparatus 100.

In case that the data of the preference for the guest OS to be operated does not exist (N in S702), a screen of a host OS of the electronic apparatus 100 is output in the display apparatus 300 connected to the dock 200 (S707), and an input signal of the host OS interworks with an input device connected to the display apparatus 300 or an external input device (S708).

In case that the data of the preference for the guest OS to be operated exists (Y in S702), whether setting data of a preferred guest OS selected by the user in advance exist is additionally determined (S703). In case that the setting data of the preferred guest OS selected by the user in advance exist (Y in S703), the guest OS according to the setting data of the preferred guest OS is automatically operated (S704). An operation screen of the preferred guest OS is output through the display apparatus 300 connected to the dock 200 (S705). Further, an input signal of the guest OS interworks with the input device connected to the display apparatus 300 or the external input device (S706).

In case that the setting data of the preferred guest OS selected by the user in advance does not exist (N in S703), a list of all of guest OSs that are installed in the electronic apparatus 100 and may be operated is output (S709). When the user selects a guest OS desired to be operated from the list of the guest OSs displayed on a screen of the electronic apparatus 100 (S710), the selected guest OS is operated, and the operated guest OS is output through the display apparatus 300 connected to the dock 200 (S711). Further, an input signal of the guest OS interworks with the input device connected to the display apparatus 300 or the external input device (S712).

Figure 8:
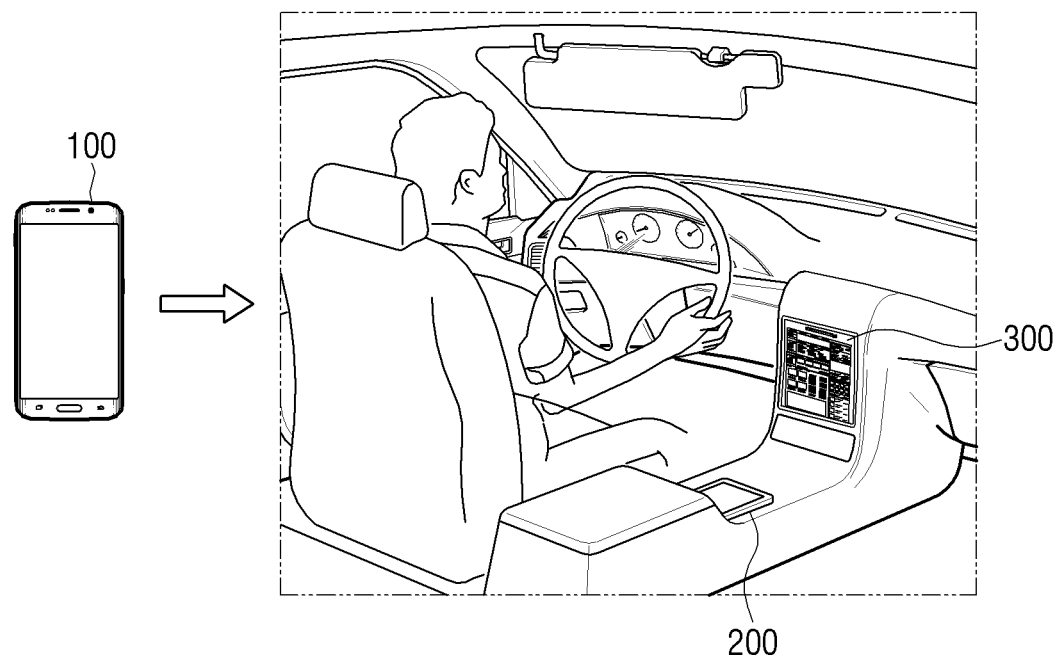
FIG. 8 is a diagram illustrating an example docking station according to an embodiment of the disclosure.
Figure 9:
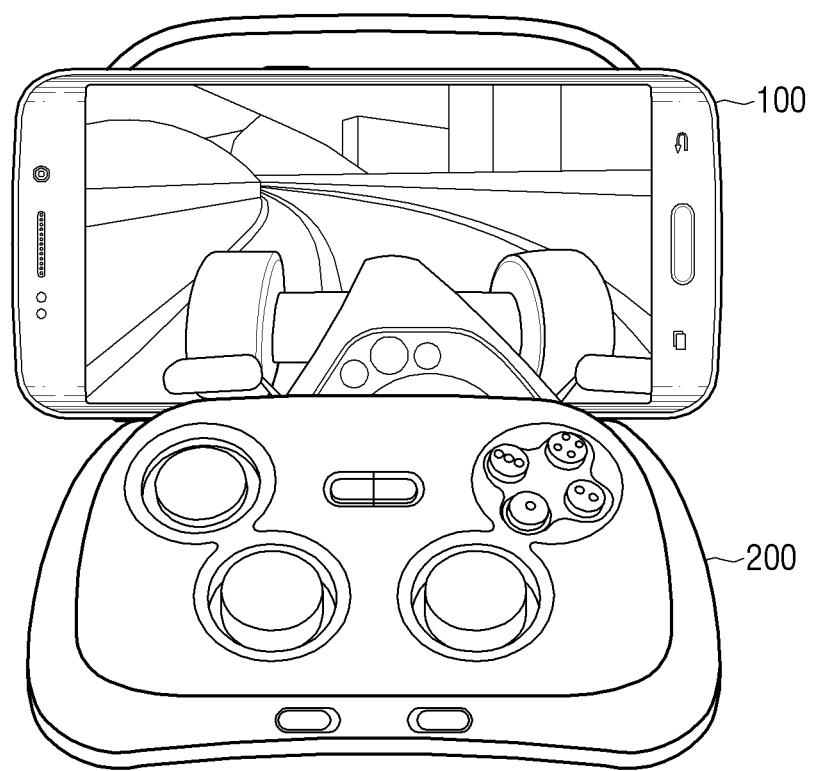
FIG. 9 is a diagram illustrating an example docking station according to another embodiment of the disclosure.

FIG. 8 is a diagram illustrating an example docking station according to an embodiment of the disclosure, and FIG. 9 is a diagram illustrating an example docking station according to another embodiment of the disclosure.

As illustrated in FIG. 8, the docking station of the disclosure may also be applied to a vehicle. For example, the vehicle generally includes a display apparatus 300 providing various information related to a driving of a vehicle, such as, for example, and without limitation, a navigation system, or the like. In this case, when the user connects a smartphone 100 to a dock 200 provided in the vehicle, the operations of the disclosure described with reference to FIGS. 3, 4 and 5 may be applied as they are.

Further, as illustrated in FIG. 9, the dock 200 connected to the electronic apparatus 100 of the disclosure may also be implemented, for example, and without limitation, by a game pad. For example, when the smartphone 100 is connected to the game pad 200, the smartphone 100 may receive identification information from the game pad 200. The smartphone 100 may operate a guest OS corresponding to the connected game pad 200 from among a plurality of stored guest OSs based on the received identification information. It may, for example, be preferable that the operated guest OS is a guest OS in which a game interworking with the game pad 200 may be executed. An operation screen of the guest OS may be output through a display 140 of the smartphone 100.

Further, in various example embodiments, a graphics processing unit (GPU) may be embedded in the game pad 200. In this case, when the smartphone 100 is connected to the game pad 200, the guest OS operated in the smartphone 100 may interwork with the GPU embedded in the game pad 200, instead of a GPU embedded in the smartphone 100, with the connection between the smartphone 100 and the game pad 200. As such, the electronic apparatus 100 may also utilize resources of a GPU or the like embedded in the dock 200.

Figure 10:
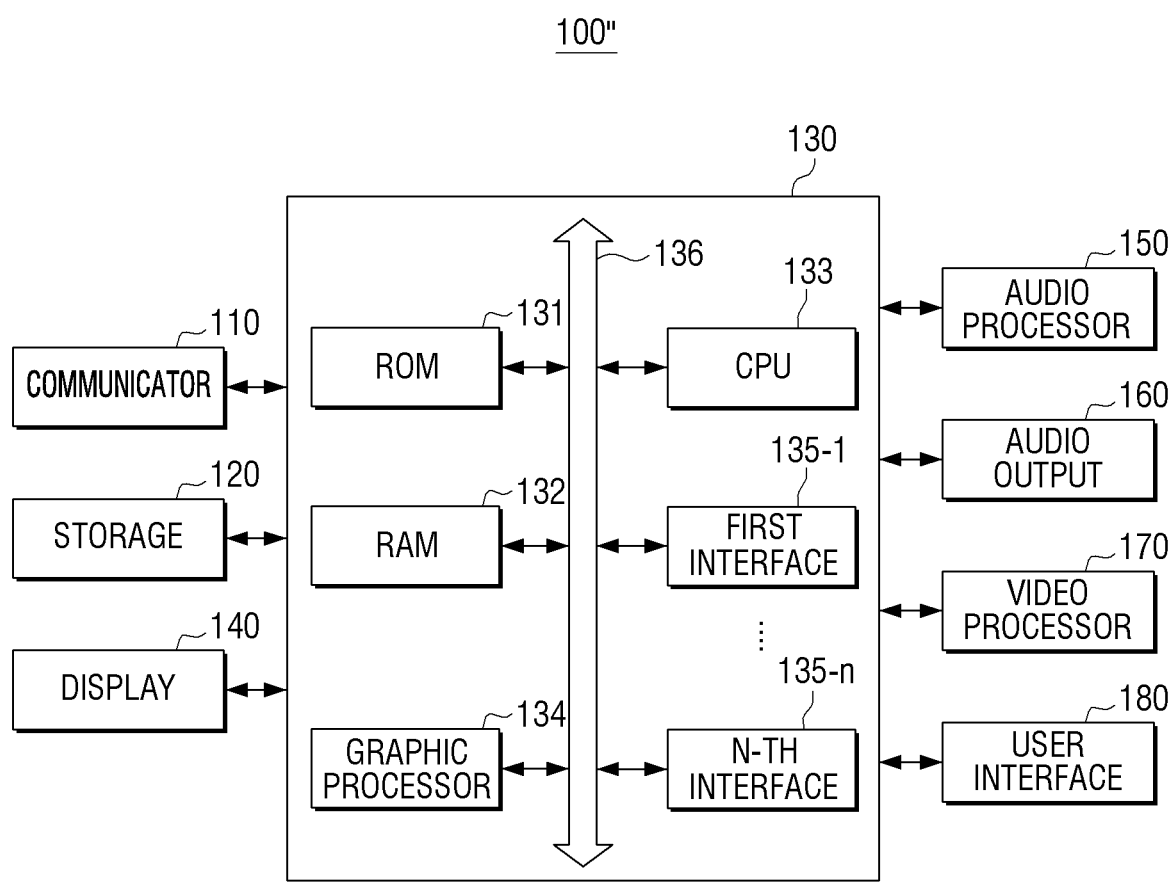
FIG. 10 is a block diagram illustrating an example configuration of an electronic apparatus according to another embodiment of the disclosure.

FIG. 10 is a block diagram illustrating an example configuration of an electronic apparatus according to another embodiment of the disclosure.

As illustrated in FIG. 10, an electronic apparatus 100" according to another example embodiment of the disclosure may include a communicator (e.g., including communication circuitry) 110, a storage 120, a processor (e.g., including processing circuitry) 130, a display 140, an audio processor (e.g., including audio processing circuitry) 150, an audio output (e.g., including audio output circuitry) 160, a video processor (e.g., including video processing circuitry) 170, and a user interface 180. Hereinafter, a description for some components overlapping with those illustrated in FIGS. 2A and 2B will not be repeated.

The storage 120 may store various data such as, for example, and without limitation, a plurality of OS software modules for driving the electronic apparatus 100", various multimedia contents, and the like, therein.

In addition, the storage 120 may store a base module processing a signal transferred from each hardware included in the electronic apparatus 100", a storage module managing a database (DB) or a registry, a graphic processing module generating a layout screen, a security module, and the like, therein. For example, the storage 120 may store a module related to the architectures described with reference to FIGS. 6A, 6B and 6C.

The processor 130 may include a read only memory (ROM) 131, a random access memory (RAM) 132, a central processing unit (CPU) 133, a graphic processor 134, and first to n-th interfaces 135-1 to 135-n. The ROM 131, the RAM 132, the CPU 133, the graphic processor 134, and the first to n-th interfaces 135-1 to 135-*n* may be connected to one another through a bus 136.

The CPU 133 may access the storage 120 to perform booting using an OS stored in the storage 120. In addition, the CPU 133 may perform various operations using various programs, contents, data, and the like, stored in the storage 120.

An instruction set for booting a system, or the like, may, for example, be stored in the ROM 131. When a turn-on instruction is input to supply power to the electronic apparatus 100", the CPU 133 may copy the OS stored in the storage 120 to the RAM 132 according to instructions stored in the ROM 131, and operates the OS to boot the system. When the booting is completed, the CPU 133 may copy various application programs stored in the storage 120 to the RAM 132, and executes the application programs copied to the RAM 132 to perform various operations.

The graphic processor 134 renders a screen including various objects such as an icon, an image, a text, and the like, using a calculator (not illustrated) and a renderer (not illustrated). The calculator calculates attribute values such as coordinate values at which the respective objects will be displayed, forms, sizes, colors, and the like, of the respective objects depending on a layout of a screen. The renderer renders screens with various layouts including objects based on the attribute values calculated in the calculator.

The first to n-th interfaces 135-1 to 135-*n* are connected to the various components described above. One of the interfaces may, for example, and without limitation, be a network interface connected to an external apparatus through a network.

The operation of the processor 130 described above may be performed by executing a program stored in the storage 120.

The display 140 may, for example, be a component providing a screen including an operation screen of an OS operated in the electronic apparatus 100" and an execution screen of contents. The contents may include contents having various formats, such as a text, an image, a video, a graphic user interface (GUI), or the like.

Implementation of the display 140 is not limited, and, for example, the display 140 may be implemented by various types of displays such as, for example, and without limitation, a liquid crystal display (LCD), an organic light emitting diode (OLED) display, an active-matrix organic light emitting diode (AM-OLED), a plasma display panel (PDP), and the like. The display 140 may include additional components depending on the type of implemented display 140. For example, when the display 140 is a liquid crystal type, the display 140 may include an LCD display panel (not illustrated), a backlight unit (not illustrated) supplying light to the LCD display panel, and a panel driving substrate (not illustrated) driving the panel (not illustrated).

The audio processor 150 may include various audio processing circuitry for performing processing for audio data.

The audio output 160 may include various audio output circuitry for outputting the audio data processed in the audio processor 150.

The video processor 170 may include various video processing circuitry for performing various kinds of image processing such as, for example, and without limitation, decoding, scaling, noise filtering, frame rate converting, resolution converting, and the like, for the contents.

The user interface 180 may, for example, be a component detecting a user interaction for controlling a general operation of the electronic apparatus 100". The user interface 180 may include various interaction detection apparatuses such as, for example, and without limitation, an infrared (IR) signal receiver (not illustrated), a camera (not illustrated), and the like.

Figure 11:
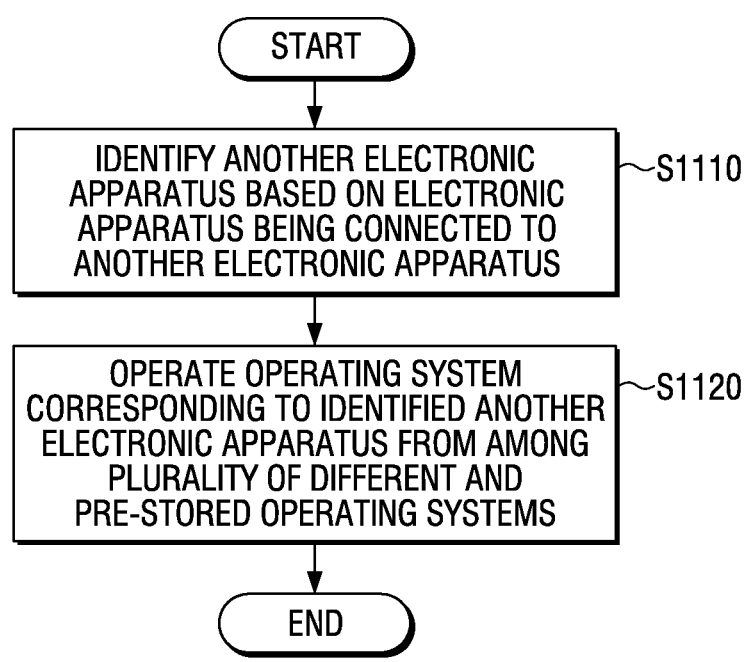
FIG. 11 is a flowchart illustrating an example control method of an electronic apparatus according to an embodiment of the disclosure.

FIGS. 11 and 12 are flowcharts illustrating example control methods of an electronic apparatus according to different example embodiments of the disclosure.

FIG. 11 is a flowchart illustrating an example control method of an electronic apparatus according to an embodiment of the disclosure.

The another electronic apparatus may be identified based on an electronic apparatus being connected to another electronic apparatus (S1110). The another electronic apparatus may be identified using pre-stored identification information of the another electronic apparatus.

An OS corresponding to the identified another electronic apparatus may be operated, from among the plurality of different and pre-stored OSs (S1120). An OS corresponding to the identified another electronic apparatus may, for example, be operated using pre-stored setting information of the OS to be operated with the connection to the another electronic apparatus. The setting information may, for example, be set based on a preference of the user or a characteristic of the another electronic apparatus.

An image signal corresponding to an operation screen of the operated OS may be transmitted to the another electronic apparatus so that the image signal corresponding to the operation screen is output in a display apparatus connected to the another electronic apparatus.

Further, the image signal corresponding to the operation screen of the operated OS may also be output through a display included in the electronic apparatus.

FIG. 12 is a flowchart illustrating an example control method of an electronic apparatus in which the user may select an OS to be operated every time the electronic apparatus 100 is connected to the dock 200.

An image signal corresponding to a UI screen for selecting any one of a plurality of OSs is output based on an electronic apparatus being connected to another electronic apparatus, from among the plurality of different and pre-stored OSs (S1210). In this case, the UI screen may be a screen providing a list of the plurality of stored OSs.

The selected OS is operated based on any one of the plurality of stored OSs being selected (S1220).

An image signal corresponding to an operation screen of the operated OS may be transmitted to the another electronic apparatus so that the image signal corresponding to the operation screen is output in a display apparatus connected to the another electronic apparatus.

Further, the image signal corresponding to the operation screen of the operated OS may also be output through a display included in the electronic apparatus.

According to various example embodiments of the disclosure, as the electronic apparatus is connected to the dock in the docking state environment, the user may be automatically provided with a working environment of a preferred OS, thereby improving convenience of the user.

In addition, the control methods according to various example embodiments described above may be implemented by a program and be stored in various recording media. For example, a computer program for executing the various control methods by being processed by various processors may be used in a state where it is stored in a recording medium.

As an example, a non-transitory computer-readable medium in which a program sequentially performs identifying another electronic apparatus based on an electronic apparatus being connected to the another electronic apparatus, and operating an OS corresponding to the identified another electronic apparatus from among a plurality of OSs is stored may be provided, the plurality of different and pre-stored OSs.

The non-transitory computer-readable medium may be a medium that semi-permanently stores data therein and is readable by an apparatus. For example, the various applications or programs described above may be stored and provided in the non-transitory computer readable medium such as, for example, and without limitation, a compact disk (CD), a digital versatile disk (DVD), a hard disk, a Blu-ray disk, a universal serial bus (USB), a memory card, a read only memory (ROM), or the like.

Although various example embodiments of the disclosure have been illustrated and described hereinabove, the present disclosure is not limited to the various example embodiments described above, but may be variously modified by those skilled in the art to which the present disclosure pertains without departing from the scope and spirit of the disclosure as, for example, set forth in the claims. These modifications should also be understood to fall within the technical spirit and scope of the present disclosure.

What is claimed is:

1. An electronic apparatus, comprising:
a display;
a communicator comprising communication circuitry;
a storage storing a plurality of operating systems, each of the plurality of operating systems being different from each other; and
a processor configured to:
  detect a connection between the electronic apparatus and an external apparatus through the communicator,
  based on the connection between the electronic apparatus and the external apparatus being detected, identify a type of the external apparatus,
  operate an operating system corresponding to the identified type of the external apparatus, from among the plurality of stored operating systems in the storage, and
  control the display to display an image corresponding to an operation screen of the operated operating system.

2. The electronic apparatus as claimed in claim 1, wherein the processor is configured to transmit an image signal corresponding to the operation screen of the operated operating system to the external apparatus through the communicator so that the image signal corresponding to the operation screen is capable of being output in a display apparatus connected to the external apparatus.

3. The electronic apparatus as claimed in claim 1, wherein the storage is further configured to store identification information of the external apparatus and setting information of the operating system to be operated with the connection to the external apparatus, and
wherein the processor is configured to:
  identify the type of the external apparatus using the stored identification information, and
  operate the operating system corresponding to the identified type of the external apparatus using the setting information.

4. The electronic apparatus as claimed in claim 1, wherein the communicator includes an interface comprising circuitry configured to provide a connection to the external apparatus in a wired manner and/or docking with the external apparatus.

5. The electronic apparatus as claimed in claim 1, wherein the communicator includes an interface comprising circuitry configured to provide a wireless connection to the external apparatus.

6. The electronic apparatus as claimed in claim 3, wherein the setting information includes information set based on a preference of a user and/or a characteristic of the external apparatus.

7. An electronic apparatus, comprising:
a communicator comprising communication circuitry configured to provide a connection to an external apparatus;
a storage configured to store a plurality of operating systems, each of the plurality of operating systems being different from each other; and
a processor configured to:
  based on a connection between the electronic apparatus and the external apparatus being detected, control a display to display a user interface (UI) comprising a list of the plurality of stored operating systems, and
  based on a user input for selecting an operating system from among the plurality of stored operating systems being received through the UI, operate the selected operating system.

8. The electronic apparatus as claimed in claim 7, wherein the display is included in a display apparatus connected to the external apparatus, and the processor is configured to transmit an image signal corresponding to an operation screen of the operated operating system to the external apparatus through the communicator so that the image signal corresponding to the operation screen is capable of being output in the display apparatus connected to the external apparatus.

9. The electronic apparatus as claimed in claim 7, wherein the display is included in the electronic apparatus and the processor is configured to control the display to display an image signal corresponding to an operation screen of the operated operating system.

10. The electronic apparatus as claimed in claim 7, wherein the communicator includes an interface comprising circuitry configured to provide a connection to the external apparatus in a wired manner and/or docking with the external apparatus.

11. The electronic apparatus as claimed in claim 7, wherein the communicator includes an interface comprising circuitry configured to provide a wireless connection to the external apparatus.

12. A control method of an electronic apparatus including a display, a communicator comprising communication circuitry and a storage storing a plurality of operating systems, each of the plurality of operating systems being different from each other, the method comprising:
detecting a connection through the communicator between the electronic apparatus and an external apparatus;
based on the connection between the electronic apparatus and the external apparatus being detected, identifying a type of external apparatus;
operating an operating system corresponding to the identified type of the external apparatus, from among the plurality of different pre-stored operating systems in the storage; and
controlling the display to display an image corresponding to an operation screen of the operated operating system.

13. The control method as claimed in claim 12, further comprising transmitting an image signal corresponding to the operation screen of the operated operating system to the external apparatus so that the image signal corresponding to the operation screen is capable of being output in a display apparatus connected to the external apparatus.

14. The control method as claimed in claim 12, wherein in the identifying, the type of the external apparatus is identified using pre-stored identification information of the external apparatus, and in the operating, an operating system corresponding to the identified type of the external apparatus is operated using pre-stored setting information related to an operating system to be operated with the connection to the external apparatus.

15. The control method as claimed in claim 14, wherein the setting information includes information set based on a preference of a user and/or a characteristic of the external apparatus.

* * * * *